A. HOLLANDER.
PERISCOPE.
APPLICATION FILED APR. 12, 1916.
1,290,746.
Patented Jan. 7, 1919.
2 SHEETS—SHEET 1.
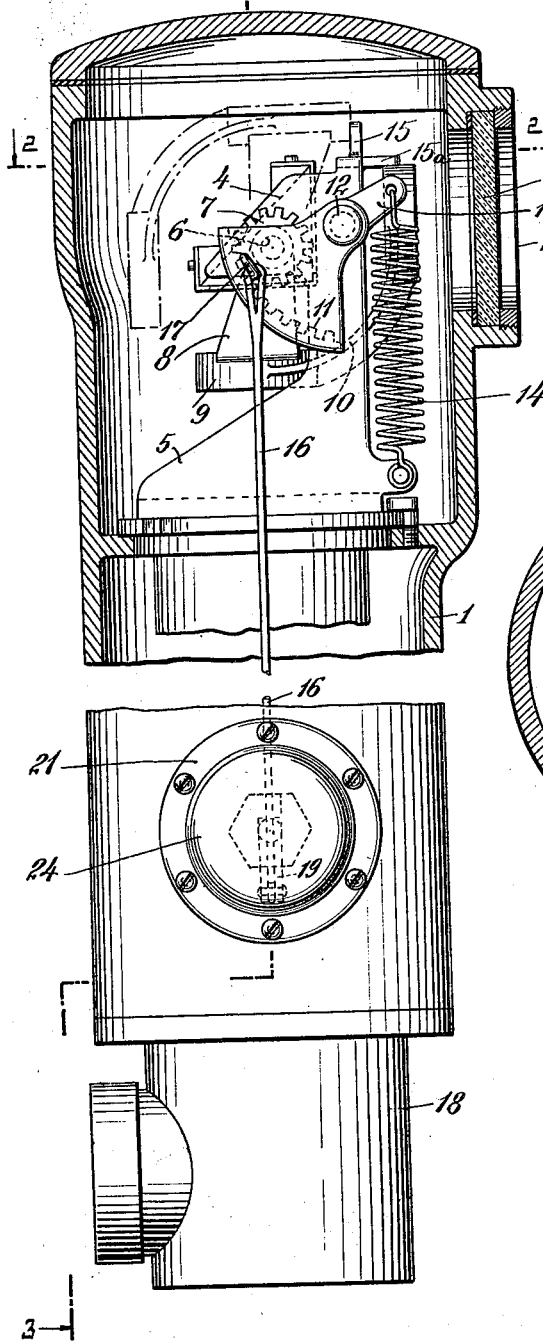
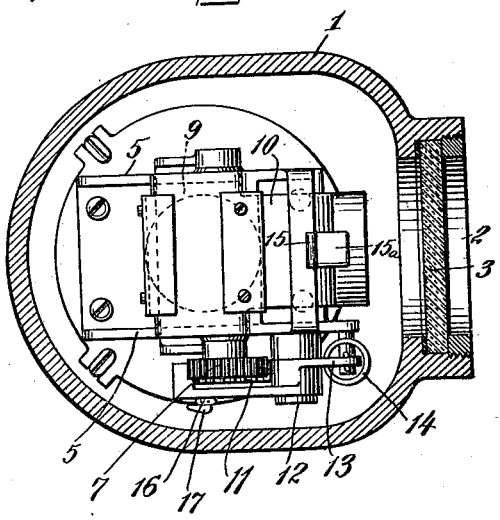
Inventor
Aladar Hollander
By his Attorneys
Pennie, Davis & Mervin

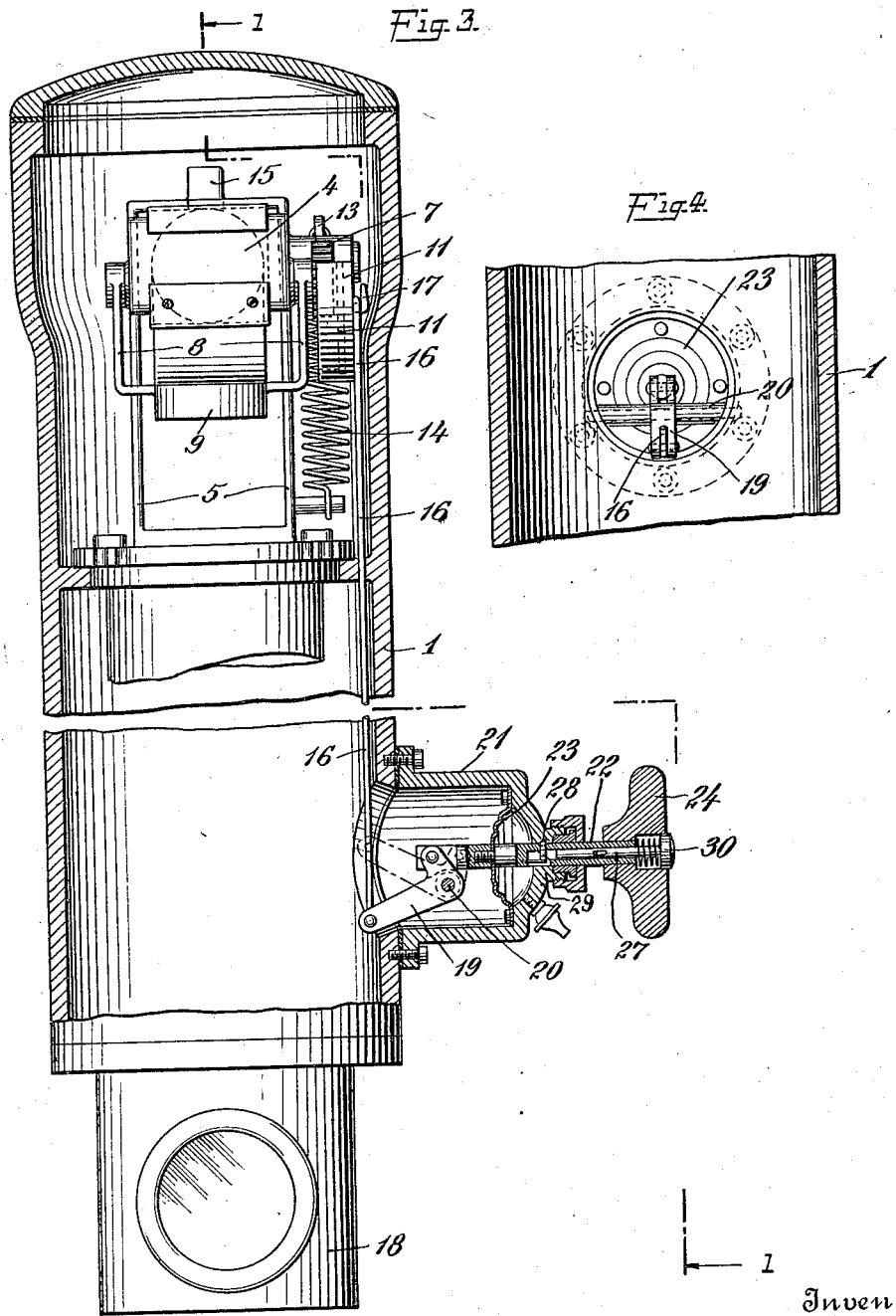

UNITED STATES PATENT OFFICE.

ALADAR HOLLANDER, OF NEW LONDON, CONNECTICUT, ASSIGNOR TO ELECTRIC BOAT COMPANY, OF NEW YORK, N. Y., A CORPORATION OF NEW JERSEY.

PERISCOPE.

1,290,746. Specification of Letters Patent. Patented Jan. 7, 1919.

Application filed April 12, 1916. Serial No. 90,544.

*To all whom it may concern:*

Be it known that I, ALADAR HOLLANDER, a citizen of Hungary, and a resident of New London, county of New London, and State of Connecticut, have invented certain new and useful Improvements in Periscopes; and I do hereby declare the following to be a full, clear, and exact description of the invention, such as will enable others skilled in the art to which it appertains to make and use the same.

This invention relates to periscopes, and particularly to periscopes for submarine boats. Periscopes as now constructed for submarine boats embody a hermetically sealed tube projecting to the desired distance above the vessel and having at or near its upper end an objective for receiving the image to be viewed, and at its lower end within the hull of the boat a suitable eye-piece through which the image may be observed by means of interposed reflectors at the objective and the eye-piece.

It is essential to the satisfactory use of a periscope that the periscope tube contain dry air or other gas and be hermetically sealed against the admission of moisture, as otherwise the lowering of the temperature, such for instance as produced by the submergence of the periscope into water colder than the air, will cause the contained moisture to condense on the surface of the reflectors and lenses and other optical members of the system and obscure the image so that accurate observation is impossible.

It is also desirable to arrange in the lens system of the periscope certain shiftable elements whereby the magnifying power of the periscope may be altered to permit either an observation of wide extent or a magnified view of a smaller extent.

The use of such shiftable elements, while a simple matter from an optical standpoint, involves a question of practical difficulty in that the movement must be effected from a control device located without the periscope, thereby necessitating the use of a power operated shifting mechanism inclosed entirely within the periscope, or a part movably mounted in the wall of the periscope, to communicate the movement of the manually operated exterior part to the shifting mechanism for the lenses. The use of a motor-operated apparatus is objectionable from the standpoint of cost, also for the reason of inaccessibility of the apparatus for adjustment or repair while the manually operated device as heretofore constructed is open to the more serious objection that no matter how carefully constructed and packed, the joint through the wall of the periscope cannot be maintained absolutely tight and in a short time the contained gas in the periscope absorbs sufficient moisture to produce the objectionable condensation above described.

The object of my present invention is to provide a periscope of the bi-focal type having a simple manually operated apparatus for varying the magnifying power of the periscope in which the possibility of leakage of moisture into the periscope is entirely obviated.

With the above objects in view, my invention consists in the construction shown in the accompanying drawings and hereinafter described, in which drawings—

Figure 1 is a side elevation partly in section of my improved periscope, the section being taken on line 1—1 of Fig. 3;

Fig. 2 is a transverse section on line 2—2 of Fig. 1;

Fig. 3 is a view similar to Fig. 1 at right angles thereto, the sections being taken on line 3—3 of Fig. 1; and Fig. 4 is a detail view of a portion of the operating connections for shifting the lenses of the periscope.

Referring to the drawings, 1 indicates the periscope tube having the lateral opening 2 closed by the objective glass 3 which may have either plane surfaces as shown or curved surfaces to constitute one of the lenses of the system. Back of the glass 3 and fixedly supported on the periscope is a prismatic reflector 4, the same being supported between a pair of spaced standards 5 whose base is carried by a transverse web of the periscope tube.

Set in the rear edges of the standards 5 are two stub-shafts 6 on one of which is mounted a pinion 7 rigidly attached to the hub of one of the swinging bracket arms 8 which support the integrally attached lens-bracket 9. The lens-bracket 9 comprises a lens supporting web connecting the outer ends of the arms 8 and an arm 10 projecting from the web and curved to be substantially concentric with the axis of rotation of the bracket-arms. The arm 10 carries at its end a second lens, the two lenses being substantially 90° apart, whereby in one position of adjustment as shown in dot and dash lines in Fig. 1, both lenses are out of the path of the rays through the objective and through the reflecting prism, and in the other position of adjustment one of the lenses is positioned between the objective and the prism and the other lies below the prism in the path of the reflected rays.

For actuating the pinion 7 there is provided adjacent thereto a sector-shaped rack 11 with internal teeth meshing with the teeth of the pinion, the rack being pivotally mounted on a pin 12 projecting from the face of the adjacent standard 5. Attached to the hub of the sector-shaped rack and extending oppositely thereto is an arm 13 to whose outer end is attached a tension spring 14, whose lower end is anchored to the base of the standard, whereby the pull of the spring tends to move the rack and rotate the lens-carrying bracket in a clockwise direction.

The two standards 5 are connected at the upper ends by a transverse bridge-piece carrying two stops 15, 15ª for limiting the movement of the lens-carrying bracket to exactly 180 degrees, as indicated in full and dotted lines in Fig. 1.

For operating the rack 11 against tension of the spring there is provided a cable 16 connected to the hook 17 in the outer face of the sector and extending down the periscope tube close to the wall thereof to a point adjacent the eye-piece 18 where its lower end is attached to the horizontal arm of a bell crank lever 19. The lever 19 is fulcrumed on a rod 20 extending across a housing 21 attached to the wall of the periscope immediately above the eye-piece and with its interior communicating with the inside of the periscope. The rod 20 is set slightly below the middle line of the housing and the short upwardly projecting arm of the bell crank is pivotally connected to a thrust rod 22 supported in the end wall of the housing.

The rod 22 is formed of two parts threaded together as shown in section in Fig. 3 so as to be clamped on opposite sides of a diaphragm 23 preferably of corrugated resilient metal whose outer periphery is firmly attached to the inner face of the end wall of the housing 21 adjacent the edge thereof, the middle portion of the end wall being curved outwardly to allow the diaphragm to extend to its full convexity on the outward movement of the rod. The movement of the rod 22 is sufficient to shift the movable lenses through their intended arc of 180 degrees and a knob 24 is provided on the end of the rod for facilitating its operation.

In order to maintain the rod in its innermost position in which the spring is held under tension, a latch may be provided, here shown as consisting of a cam rod 27 mounted axially in the rod 22 with its inclined cam face engaging the catch 28 which engages a socket in the bearing 29 of the rod 22. The end of the cam rod is spring-held in its outer position and is provided with a small knob 30 fitting a recess in the outer face of the knob 24. The bearing 29 for the rod 22 is preferably packed as shown as a safeguard in case of an accident to the periscope which would subject the diaphragm to an external pressure greater than it could stand.

The diaphragm 23 may obviously be made perfectly tight, the joints at the edge and at the stem being brazed or soldered if desired, so that the periscope tube is perfectly sealed against moisture for an indefinite period, and a pet cock is provided to relieve the pressure between the diaphragm and the end wall of the housing.

The diaphragm is preferably made of corrugated metal as shown as the most suitable material combining flexibility and durability, but obviously other materials may be used, and other changes in the operating mechanism and the mounting of the lenses may also be made within the scope of my invention as defined in the appended claims.

My invention may also be used with equal advantage for shifting optical parts (prisms and lenses) for other than magnifying purposes as for example, looking out of an upper window for aeroplanes, or out of a back window without turning the periscope.

I claim:

1. In a periscope adapted to be hermetically sealed, the combination of an adjustable member within said tube, and means for operating said member from a shiftable element without said tube comprising a movable actuating member passing through the wall of said tube and a flexible part rigidly attached to said actuating member and also rigidly attached to said tube.

2. In a periscope adapted to be hermetically sealed, the combination of an adjustable member within said tube, means for operating said member from without said tube comprising a member mounted for reciprocation in the wall of said tube, and a flexible diaphragm fixedly attached to said member and to the wall of said tube.

3. In a periscope, adapted to be hermetically sealed, the combination of an adjustable member within said tube, and means for operating said member from without said tube comprising a manually operatable member mounted for reciprocation in the wall of said tube, a diaphragm of corrugated sheet metal fixedly attached to said member at its center and to the wall of said tube at its periphery.

4. In a periscope the combination of a periscope tube containing an optical system of several elements, certain of said elements being movable into and out of operative position in said system, a pivotally mounted carrier for said elements, a spring for normally holding said carrier in one position of adjustment, and means for adjusting said carrier against the tension of its spring comprising a cylindrical housing projecting laterally from the wall of said periscope, a rod slidingly mounted in said housing and operatively connected to said carrier, and a flexible diaphragm connected at its center to said rod and at its periphery to the wall of said housing.

5. In a periscope the combination of a periscope tube containing an optical system of several elements, certain of said elements being movable into and out of operative position in said system, a pivotally mounted carrier for said elements, a spring for normally holding said carrier in one position of adjustment and means for adjusting said carrier against the tension of its spring comprising a cylindrical housing having a closed end, a rod mounted for sliding movement through the end wall of said housing and operatively connected to said carrier, said end wall having a cavity on its inner face and a flexible diaphragm attached at its center to said rod within said housing and at its periphery to the end wall of said housing surrounding said cavity whereby on reciprocation of said rod said diaphragm may be bowed in either direction.

In testimony whereof I affix my signature.

ALADAR HOLLANDER.

Copies of this patent may be obtained for five cents each, by addressing the "Commissioner of Patents, Washington, D. C."